(12) United States Patent
Takeuchi

(10) Patent No.: US 10,647,008 B2
(45) Date of Patent: May 12, 2020

(54) ROBOT

(71) Applicant: Seiko Epson Corporation, Tokyo (JP)

(72) Inventor: Junichi Takeuchi, Chino (JP)

(73) Assignee: Seiko Epson Corporation (JP)

(*) Notice: Subject to any disclaimer, the term of this patent is extended or adjusted under 35 U.S.C. 154(b) by 244 days.

(21) Appl. No.: 15/806,696

(22) Filed: Nov. 8, 2017

(65) Prior Publication Data

US 2018/0147733 A1 May 31, 2018

(30) Foreign Application Priority Data

Nov. 29, 2016 (JP) ................................. 2016-230931

(51) Int. Cl.
| | |
|---|---|
| *B25J 18/04* | (2006.01) |
| *B25J 19/06* | (2006.01) |
| *B25J 13/08* | (2006.01) |
| *B25J 19/00* | (2006.01) |

(52) U.S. Cl.
CPC ............ *B25J 18/04* (2013.01); *B25J 13/085* (2013.01); *B25J 19/0054* (2013.01); *B25J 19/0091* (2013.01); *B25J 19/063* (2013.01)

(58) Field of Classification Search
CPC ........ B25J 18/04; B25J 13/081; B25J 13/085; B25J 19/0054; B25J 19/0091
See application file for complete search history.

(56) References Cited

U.S. PATENT DOCUMENTS

| | | | | |
|---|---|---|---|---|
| 4,709,342 A | * | 11/1987 | Hosoda ..................... | G01L 1/16 310/338 |
| 5,373,747 A | * | 12/1994 | Ogawa .................... | B25J 13/084 73/862.041 |
| 6,902,015 B2 | | 6/2005 | Furuta et al. | |
| 9,804,593 B1 | * | 10/2017 | Davis .................... | G05B 19/423 |
| 2004/0060746 A1 | * | 4/2004 | Furuta .................... | B25J 13/081 180/8.6 |
| 2015/0174771 A1 | * | 6/2015 | Fujita ....................... | B25J 19/06 700/258 |
| 2017/0136633 A1 | * | 5/2017 | Zillich ................... | B25J 9/1676 |
| 2017/0274536 A1 | * | 9/2017 | Takeuchi ............... | B25J 13/085 |

(Continued)

FOREIGN PATENT DOCUMENTS

| | | | | |
|---|---|---|---|---|
| AT | 516097 A1 | * | 2/2016 | ............ B25J 9/1676 |
| DE | 102007062245 A1 | * | 6/2009 | ............ B25J 9/1676 |
| JP | 60-025696 A | | 2/1985 | |

(Continued)

*Primary Examiner* — Vicky A Johnson
(74) *Attorney, Agent, or Firm* — Harness, Dickey & Pierce, P.L.C.

(57) ABSTRACT

A robot includes a movable part having a first internal space, a shock-absorbing section disposed outside the movable part, and having a second internal space, and a state switching section capable of switching between a first state of supplying a fluid from a fluid supply source to the first internal space and a second state of supplying the fluid from the fluid supply source to the second internal space. Further, the state switching section includes a first flow channel adapted to supply the fluid from the fluid supply source to the first internal space, a second flow channel adapted to supply the fluid from the fluid supply source to the second internal space, and a valve capable of adjusting opening/ closing degrees of each of the first flow channel and the second flow channel.

11 Claims, 8 Drawing Sheets

(56) References Cited

U.S. PATENT DOCUMENTS

2018/0147733 A1* 5/2018 Takeuchi ............... B25J 13/085
2019/0039254 A1* 2/2019 Kamon ................. B25J 9/0012

FOREIGN PATENT DOCUMENTS

| JP | 61-033894 A | 2/1986 |
| JP | 63-039786 A | 2/1988 |
| JP | 2002-361575 A | 12/2002 |
| JP | 2010-125546 A | 6/2010 |

* cited by examiner

ROBOT

BACKGROUND

1. Technical Field

The present invention relates to a robot.

2. Related Art

In JP-A-2010-125546 (Document 1), for example, there is disclosed a protective supporter, which is attached to a robot existing together with an operator (a human) and ensures safety of the operator when the robot has contact with the operator by any possibility. Such a protective supporter is provided with a shock absorber such as foamed rubber, and is used in such a manner as to cover the robot.

However, the protective supporter of Document 1 also functions as a thermal insulator because of its configuration, and therefore, the internal temperature of the robot is apt to rise in the state of covering the robot with the protective supporter. Therefore, there is a possibility that it is unachievable to sufficiently decrease the internal temperature of the robot only with a cooling fan provided to the robot.

SUMMARY

An advantage of some aspects of the invention is to provide a robot capable of cushioning an impact generated by contact with a contacted object to thereby hold down the increase in the internal temperature of the robot.

The advantage can be achieved by the following configuration.

A robot according to an aspect of the invention includes a movable part having a first internal space, a shock-absorbing section disposed outside the movable part, and having a second internal space, and a state switching section capable of switching between a first state of supplying a fluid from a fluid supply source to the first internal space and a second state of supplying the fluid from the fluid supply source to the second internal space.

In this configuration, by providing the shock-absorbing section, it is possible to cushion the impact generated when the contact with the contacted object occurs. Further, by supplying the first internal space with the fluid, it is possible to cool the first internal space with the fluid. Therefore, it is possible to obtain a robot capable of cushioning an impact generated by contact with the contacted object to thereby hold down the increase in the internal temperature of the robot.

In the robot according to the aspect of the invention, it is preferable that the state switching section includes, a first flow channel adapted to supply the fluid from the fluid supply source to the first internal space, a second flow channel adapted to supply the fluid from the fluid supply source to the second internal space, and a valve capable of adjusting opening/closing degrees of each of the first flow channel and the second flow channel.

According to this configuration, the configuration of the state switching section becomes simpler.

In the robot according to the aspect of the invention, it is preferable that the second internal space is sealed, and is provided with positive pressure in a natural state.

According to this configuration, the shock absorption of the shock-absorbing section can further be improved.

In the robot according to the aspect of the invention, it is preferable to further include a force detection section adapted to detect force applied to the shock-absorbing section.

According to this configuration, the contact with the contacted subject can be detected.

In the robot according to the aspect of the invention, it is preferable that the force detection section is provided with a pressure detection section adapted to detect pressure in the second internal space.

According to this configuration, the configuration of the force detection section becomes simpler.

In the robot according to the aspect of the invention, it is preferable that the force detection section is disposed on the movable part.

According to this configuration, it is possible to house the pressure detection section in the robot to thereby protect the pressure detection section. Further, it is possible to dispose the pressure detection section close to the second internal space, and thus, the change in pressure in the second internal space can more accurately be detected.

In the robot according to the aspect of the invention, it is preferable that the shock-absorbing section includes a flexible part disposed outside the movable part, and forming the second internal space between the flexible part and the movable part, and a regulating part disposed between the movable part and the flexible part, and adapted to regulate a displacement of the flexible part in a direction of getting away from the movable part.

According to this configuration, the configuration of the shock-absorbing section becomes simpler.

In the robot according to the aspect of the invention, it is preferable that the fluid supply source is disposed in the first internal space.

According to this configuration, the piping layout of the first flow channel and the second flow channel becomes simpler. Further, since the first flow channel and the second flow channel can be shortened, it is possible to reduce the loss to efficiently supply the fluid to the first internal space and the second internal space.

In the robot according to the aspect of the invention, it is preferable that the fluid supply source has a pump using a piezoelectric element as a drive source.

According to this configuration, reduction in size of the fluid supply source can be achieved.

In the robot according to the aspect of the invention, it is preferable to further include a temperature detection section disposed inside the first internal space.

According to this configuration, it is possible to operate the opening/closing section based on the detection result of the temperature detection section.

In the robot according to the aspect of the invention, it is preferable to further include a circuit element disposed inside the first internal space.

According to this configuration, the circuit element can be protected.

In the robot according to the aspect of the invention, it is preferable that a wall part forming the first internal space has a projection on a surface facing the first internal space.

For example, by making the projection function as a fin, it is possible to efficiently cool the first internal space.

BRIEF DESCRIPTION OF THE DRAWINGS

The invention will be described with reference to the accompanying drawings, wherein like numbers reference like elements.

DESCRIPTION OF EXEMPLARY EMBODIMENTS

The robot according to the invention will hereinafter be described in detail based on some preferred embodiments shown in the accompanying drawings.

First Embodiment

Firstly, a robot according to a first embodiment of the invention will be described.

Figure 1:
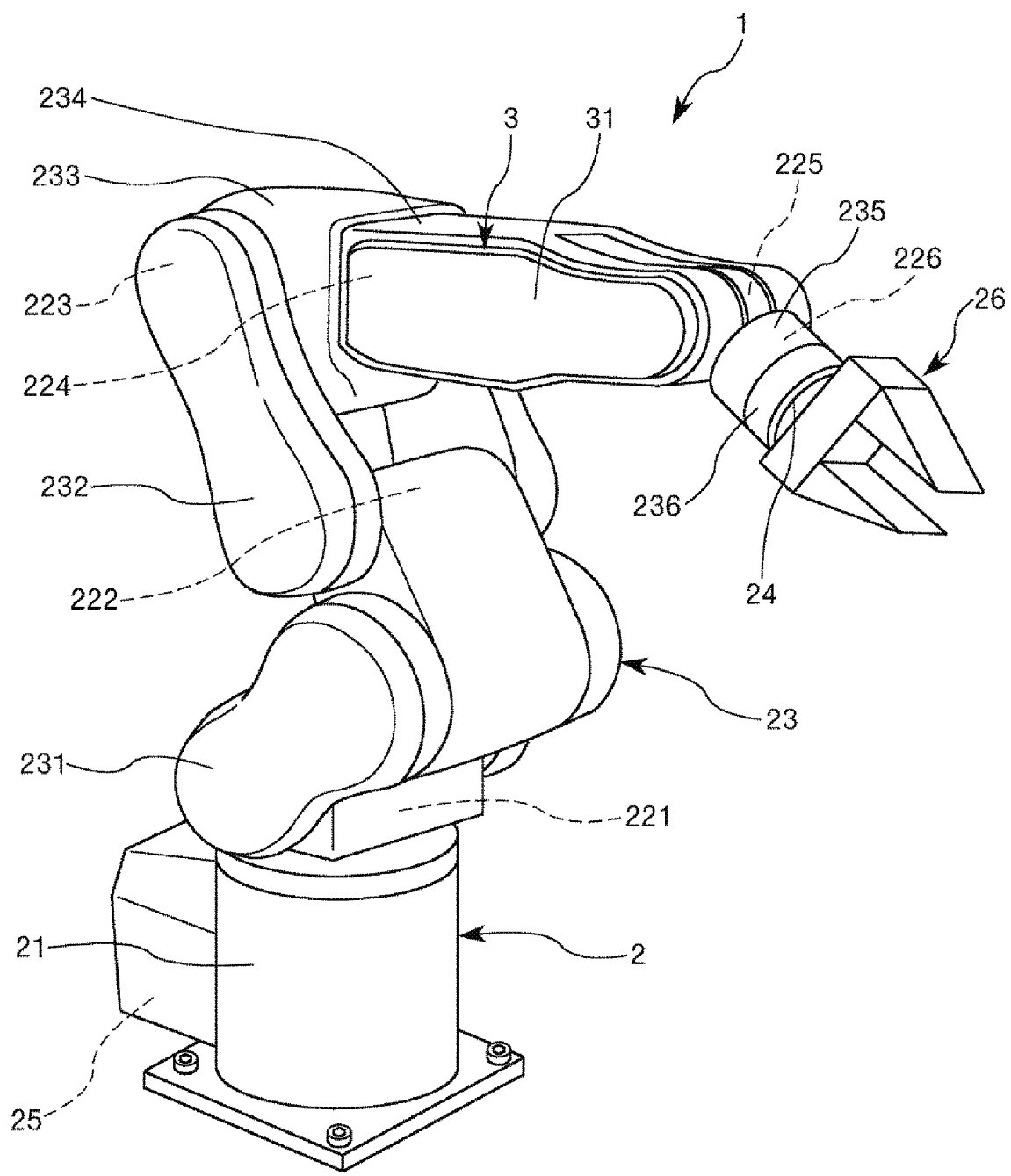
FIG. 1 is a perspective view showing a robot according to a first embodiment of the invention.
Figure 2:
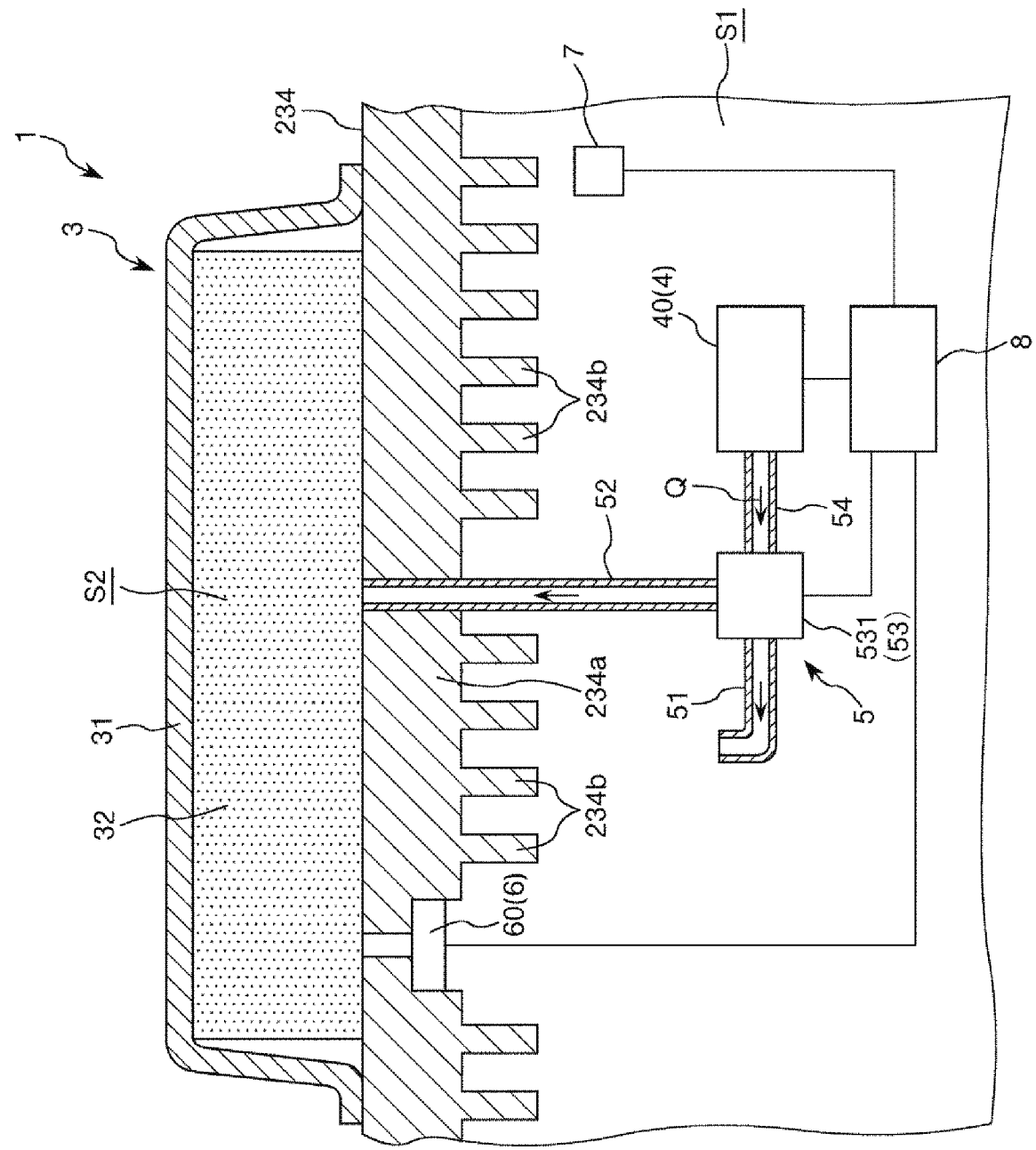
FIG. 2 is a partial enlarged cross-sectional view showing a shock-absorbing section provided to the robot shown in FIG. 1.
Figure 3:
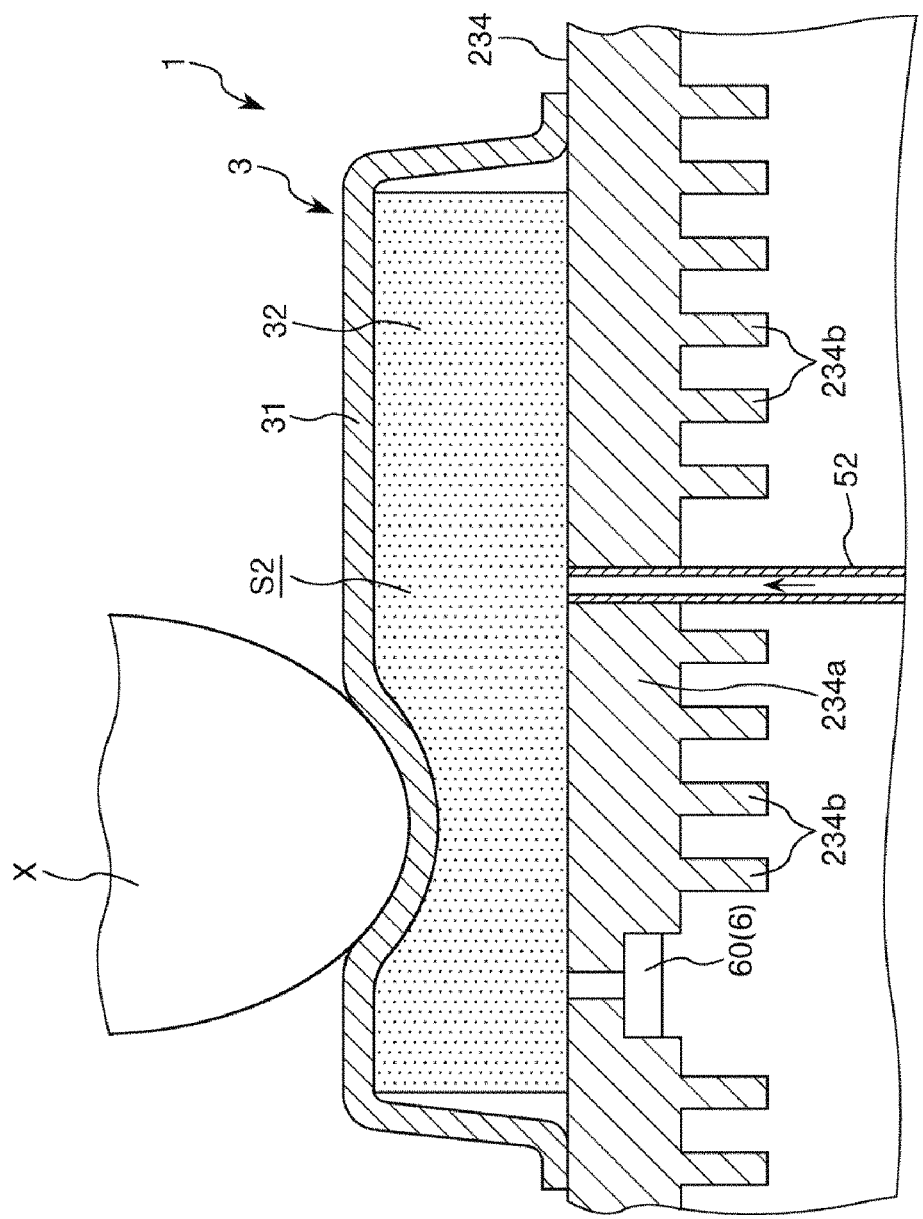
FIG. 3 is a cross-sectional view showing a state in which a contacted object has contact with the shock-absorbing section.
Figure 4:
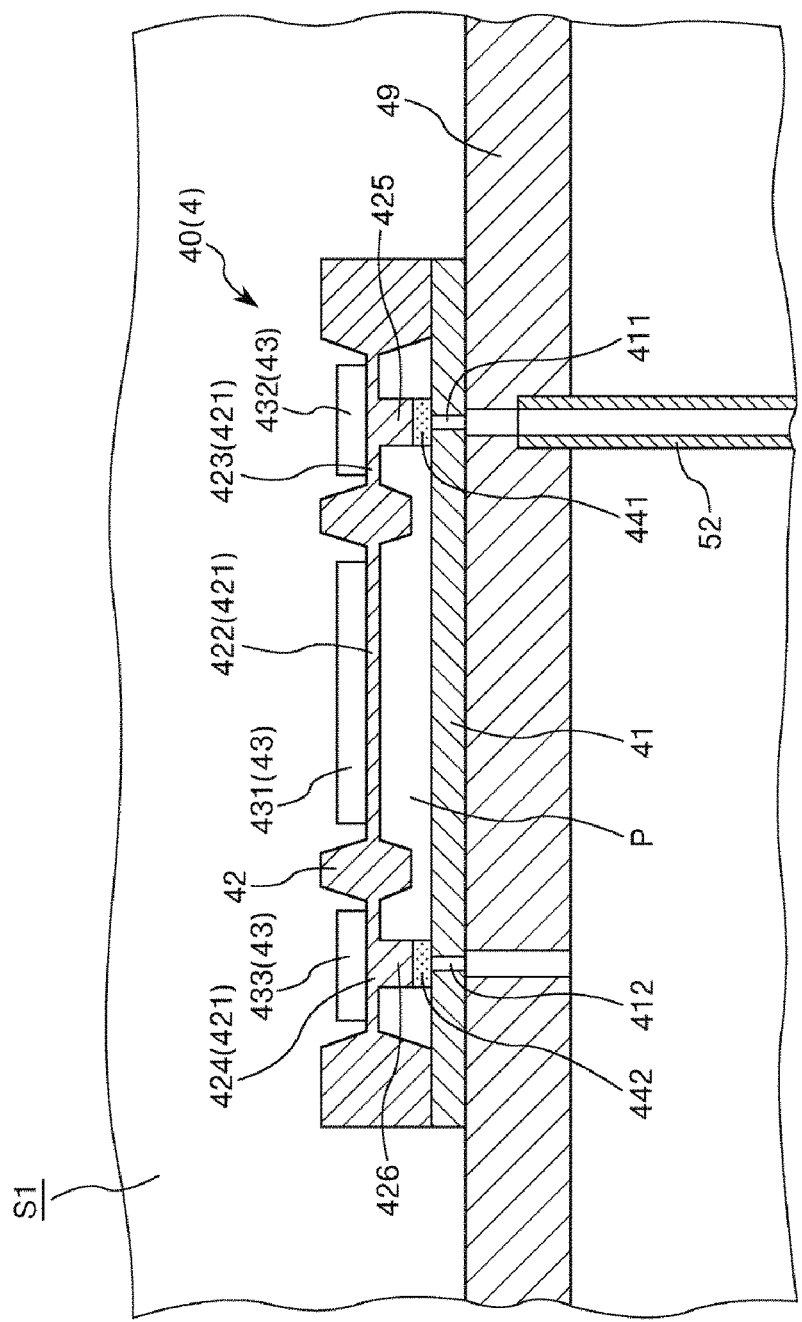
FIG. 4 is a cross-sectional view showing an example of a fluid supply source provided to the robot shown in FIG. 1.
Figure 5:
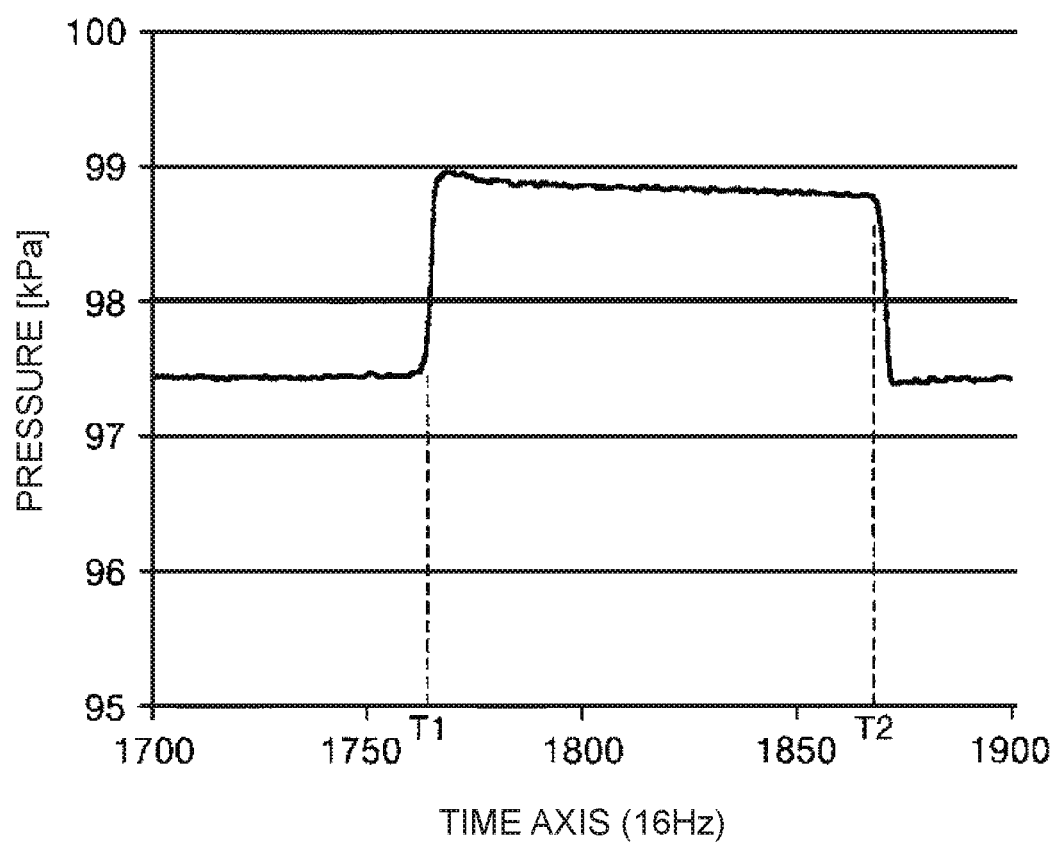
FIG. 5 is a graph showing an example of a detection signal of a pressure sensor provided to the robot shown in FIG. 1.

FIG. 1 is a perspective view showing the robot according to the first embodiment of the invention. FIG. 2 is a partial enlarged cross-sectional view showing a shock-absorbing section provided to the robot shown in FIG. 1. FIG. 3 is a cross-sectional view showing a state in which a contacted object has contact with the shock-absorbing section. FIG. 4 is a cross-sectional view showing an example of a fluid supply source provided to the robot shown in FIG. 1. FIG. 5 is a graph showing an example of a detection signal of a pressure sensor provided to the robot shown in FIG. 1. It should be noted that the upper side of each of FIG. 2 through FIG. 4 is also referred to as an "upper side," and the lower side thereof is also referred to as a "lower side" in the following descriptions for the sake of convenience of explanation.

The robot 1 shown in FIG. 1 is a robot, which can be used in a manufacturing process for manufacturing an industrial product such as precision equipment. As shown in the drawing, the robot 1 has a robot main body 2 provided with an articulated arm 23 as a movable part, and a shock-absorbing section 3 disposed outside the articulated arm 23.

As shown in FIG. 1, the robot main body 2 has a base 21 fixed to, for example, the floor or the ceiling, an arm 231 connected to the base 21 via a joint mechanism 221 and rotating on the joint mechanism 221, an arm 232 connected to the arm 231 via a joint mechanism 222 and rotating on the joint mechanism 222, an arm 233 connected to the tip of the arm 232 via a joint mechanism 223 and rotating on the joint mechanism 223, an arm 234 connected to the tip of the arm 233 via a joint mechanism 224 and rotating on the joint mechanism 224, an arm 235 connected to the tip of the arm 234 via a joint mechanism 225 and rotating on the joint mechanism 225, and an arm 236 connected to the tip of the arm 235 via a joint mechanism 226 and rotating on the joint mechanism 226. Further, the arm 236 is provided with a hand connection section 24, and to the hand connection section 24, there is attached a hand 26 (an end effector) corresponding to the operation to be performed by the robot 1. It should be noted that in the present embodiment, the articulated arm 23 is constituted by the six arms 231, 232, 233, 234, 235, and 236.

The rotary drive of each of the arms 231, 232, 233, 234, 235, and 236 is performed by an electric motor and so on incorporated in each of the joint mechanisms 221, 222, 223, 224, 225, and 226. The drive of each of the electric motors is controlled by a robot control section 25, and thus, it is possible to make the robot 1 perform a desired operation.

As shown in FIG. 2, such a robot 1 is provided with the arm 234 as a movable part having a first internal space S1, the shock-absorbing section 3 disposed outside the arm 234 and having a second internal space S2, and a fluid supply section 5 as a state switching section capable of switching between a first state of supplying a fluid Q from the fluid supply source 4 to the first internal space S1 and a second state of supplying the fluid Q from the fluid supply source 4 to the second internal space S2. According to such a configuration, since the shock-absorbing section 3 is provided, it is possible to cushion an impact generated by contact with the contacted object X (representatively an operator). Therefore, it is possible to more surely ensure the safety of the operator. Further, by supplying the fluid Q to the first internal space S1, it is possible to cool the first internal space S1 (components disposed inside the first internal space S1) with the fluid Q. Therefore, it is possible to prevent excessive rise in the internal temperature (the temperature of the components) of the robot 1, and thus, it is possible to prevent a failure, deterioration and a variation of the drive characteristics, and so on of the robot 1.

Here, in the present embodiment, a gas is used as the fluid Q. The fluid Q in this case is not particularly limited, and there can be cited air (the air), nitrogen, a noble gas such as argon, and air (the air) is used in the present embodiment as the fluid Q. Thus, it is possible to easily ensure the material of the fluid Q, and the configuration of the robot 1 is simplified. It should be noted that in the case of using the noble gas as the fluid Q, the atmosphere in the second internal space S2 becomes more stable. However, the fluid Q is not limited to a gas, and there can be used a liquid, a gel, and so on as the fluid Q besides a gas.

As shown in FIG. 2, the first internal space S1 is formed inside the arm 234. In other words, the first internal space S1 is formed so as to be surrounded by a housing 234a of the arm 234. The first internal space S1 is not air-tight, but is communicated with the outside of the arm 234. Therefore, it becomes hard for the heat to be confined to the first internal space S1, and it is possible to prevent the excessive temperature rise in the first internal space S1.

Further, the housing 234a (a wall part forming the first internal space S1) is provided with projections 234b on the inner surface thereof, namely the surface facing the first internal space S1. Such projections 234b can be made to function as fins (heatsinks), and thus, it is possible to efficiently perform heat exchange between inside and outside of the first internal space S1. Therefore, it is possible to efficiently cool the first internal space S1. It should be noted that such projections 234b can also be omitted. Here, although not particularly limited, it is preferable for the fluid Q to be sprayed toward the projections 234b when being supplied to the first internal space S1. As shown in FIG. 2, the tip of a first flow channel 51 is directed to the projections 234b. Thus, it is possible to more efficiently cool the first internal space S1. It should be noted that the direction of the tip of the first channel 51 is not particularly limited.

It should be noted that although the constituent material of the housing 234a is not particularly limited, but it is possible to form at least a part of the housing 234a with a variety of types of metal materials such as stainless steel or aluminum. Thus, it is possible to obtain the housing 234a having higher thermal conductivity, and it is possible to more efficiently cool the first internal space S1.

The second internal space S2 provided to the shock-absorbing section 3 is sealed (i.e., airtightly sealed), and is provided with positive pressure (i.e., the pressure higher than the pressure of the atmosphere in which the robot 1 is disposed) in a natural state since the fluid Q is supplied. Thus, the shock absorption of the shock-absorbing section 3 is further improved, and the safely of the operator working around the robot 1 is further improved. It should be noted that the "natural state" described above denotes the state in which, for example, the robot 1 is at rest, and does not have contact with the contacted object X.

It should be noted that the pressure in the second internal space S2 is not particularly limited, but is preferably set to, for example, not lower than +3 and not higher than +7 kPa, and is more preferably set to about +5 kPa with respect to the pressure (atmospheric pressure) of the atmosphere in which the robot 1 is disposed. By setting the pressure in such a range, it is possible for the shock-absorbing section 3 to exert the sufficient shock absorption. Further, it is possible to perform a contact detection with the contacted object X described later with higher accuracy.

As shown in FIG. 2, the shock-absorbing section 3 is provided with a flexible part 31 and a regulating part 32. The flexible part 31 has flexibility, and is disposed outside the arm 234 to form the second internal space S2 with the arm 234 (the housing 234a). Further, the regulating part 32 is located between the arm 234 and the flexible part 31 to regulate the displacement of the flexible part 31 in the direction of getting away from the arm 234. It should be noted that the "regulation" mentioned here means the fact that the regulating part 32 is capable of making a part other than the part having contact with the contacted object X described above of the flexible part 31 hard to bulge compared to the case of omitting the regulating part 32, and preferably means the fact that the regulating part 32 is capable of preventing the part other than the part having contact with the contacted object X described above from bulging.

The flexible part 31 has a sheet-like shape, and also has flexibility and airtightness. Further, the flexible part 31 is bonded to the housing 234a of the arm 234 in the outer circumferential edge part thereof to form the second internal space S2, which is air-tight, with the housing 234a. According to such a configuration, the configuration of the shock-absorbing section 3 becomes simpler, and it is possible to form the second internal space S2 with more ease. Further, since it is possible to use the housing 234a as a member for forming the second internal space S2, it is also possible to achieve reduction of the number of components of the shock-absorbing section 3, and the consequent reduction in size and weight of the arm 234.

It should be noted that it is further preferable for the flexible part 31 not to have substantial elasticity. By making the flexible part 31 have no substantial elasticity, it is possible to inhibit the bulge of the second internal space S2 due to the positive pressure, and therefore, it is possible to efficiently increase the pressure in the second internal space S2. Further, it becomes easy to keep the pressure in the second internal space S2 constant.

The regulating part 32 is disposed inside the second internal space S2, namely between the flexible part 31 and the housing 234a. Further, the regulating part 32 has a sheet-like shape, and has an upper surface bonded to the flexible part 31, and a lower surface bonded to the housing 234a. It should be noted that the bonding between the regulating part 32 and the flexible part 31, the housing 234a can be achieved using, for example, an adhesive. By providing such a regulating part 32, it is possible to regulate the bulge of the part other than the contact part of the flexible part 31 with the contacted object X when the contact with the contacted object X occurs as shown in FIG. 3. Therefore, it is possible to more significantly change the pressure in the second internal space S2 when the contact with the contacted object X occurs. Therefore, it is possible to perform the contact detection with the contacted object X described later with higher accuracy.

In the present embodiment, the regulating part 32 is formed of an elastic body. By forming the regulating part 32 from the elastic body as described above, the configuration of the regulating part 32 is simplified, and it is possible to cushion the impact caused by the contact with the contacted object X also with the regulating part 32. Therefore, for example, the safety of the operator as the contacted object X is further improved. In particular, in the present embodiment, it is preferable for the regulating part 32 to be breathable, and in the present embodiment, the regulating part 32 is formed of a soft foam having continuous holes represented by a sponge. Therefore, the configuration of the regulating part 32 becomes simpler, and at the same time, it is possible to exert higher shock absorption. Further, the diffusivity of the fluid Q in the second internal space S2 is improved. The foam is not particularly limited, but a polyurethane foam material, for example, can be used. It should be noted that the regulating part 32 can also be formed of, for example, an aggregate of fibers or fine wires.

It should be noted that the thickness of the regulating part 32 is not particularly limited, but can be set to, for example, not smaller than 1 cm and not larger than 5 cm in the state of being disposed in the second internal space S2. By adopting the thickness of this level, the shock-absorbing section 3 becomes sufficiently thin, and it becomes easy to dispose the shock-absorbing section 3 on the arm 234. Further, the configuration of the regulating part 32 is not particularly limited providing the displacement of the flexible part 31 toward the direction of getting away from the arm 234 can be regulated.

Such a shock-absorbing section 3 is disposed on a part or the entire area of the outer circumferential surface of the arm 234. In the present embodiment, the shock-absorbing section 3 is provided to each of a pair of side surfaces of the arm 234, but this is not a limitation, and it is also possible to provide the shock-absorbing section 3 also to each of the upper surface and the lower surface shown in FIG. 1 of the arm 234.

The shock-absorbing section 3 is hereinabove described. The configuration of the shock-absorbing section 3 is not particularly limited providing the second internal space S2 can be formed. For example, the second internal space S2 is set to the positive pressure in the present embodiment, but is not limited thereto, and can also be equal to the external pressure or can also be negative pressure lower than the external pressure. Further, the shock-absorbing section 3 includes the regulating part 32 in the present embodiment, but it is also possible to omit the regulating part 32. Further, although the shock-absorbing section 3 is disposed on the arm 234 in the present embodiment, the arrangement of the shock-absorbing section 3 is not particularly limited providing the shock-absorbing section 3 is disposed on a moving part (i.e., the movable part), and it is sufficient for the shock-absorbing section 3 to be disposed on, for example, at least one of the arms 231, 232, 233, 234, 235, and 236 and the hand 26. It should be noted that in the case of disposing the shock-absorbing section 3 on the plurality of arms, it is preferable to dispose the shock-absorbing sections 3 on the respective arms independently of each other without straddling the joint mechanism. Thus, it is possible to hold down the pressure variation (the pressure variation of the second internal space S2 on the grounds other than the contact with the contacted object X) in the second internal space S2 due to, for example, a change in the relative positional relationship between the arms adjacent to each other. Therefore, it is possible to perform the contact detection with the contacted object X described later with higher accuracy.

Further, as shown in FIG. 2, the robot 1 is provided with a force detection section 6 for detecting the force applied to the shock-absorbing section 3 described above, more specifically, the force applied due to the contact with the contacted object X. Thus, it is possible to detect the contact with the contacted object X, and by urgently stopping the robot 1 or the like in the case in which the contact has been detected, it is possible to more safely operate the robot 1.

Such a force detection section 6 is provided with a pressure sensor 60 as a pressure detection section for detecting the pressure in the second internal space S2. As shown in FIG. 3, when the contacted object X has contact with the shock-absorbing section 3, the second internal space deflates to increase the pressure in the second internal space S2. Therefore, by detecting the pressure variation (rise in pressure) in the second internal space S2 using the pressure sensor 60, it is possible to more surely detect the contact with the contacted object X. As described above, by providing the force detection section 6 with the pressure sensor 60, it is possible to more surely detect the contact with the contacted object X, and at the same time, the configuration of the force detection section 6 becomes simpler. In particular, as described above, since in the present embodiment, the second internal space S2 is provided with the positive pressure, it is possible to more significantly and promptly change the pressure in the second internal space S2 due to the contact with the contacted object X. Therefore, it is possible to detect the contact with the contacted object X with higher sensitivity.

Further, the force detection section 6 (the pressure sensor 60) is disposed on the arm 234. Specifically, the pressure sensor 60 is fixed to the housing 234a so as to face the first internal space S1. Thus, it is possible to house the pressure sensor 60 inside the robot 1 to thereby protect the pressure sensor 60. Further, the pressure sensor 60 is disposed in a region of the housing 234a, the region forming the second internal space S2 together with the flexible part 31, namely in a part facing the second internal space S2. Therefore, it is possible to dispose the pressure sensor 60 closer to the second internal space S2. Thus, the pressure loss decreases, and at the same time, the time lag until the pressure sensor 60 detects the change in pressure in the second internal space S2 shortens, and thus, it is possible for the pressure sensor 60 to more accurately detect the pressure in the second internal space S2. Therefore, according to the force detection section 6, it is possible to detect the contact between the robot 1 and the contacted object X with higher sensitivity. Further, since the pressure sensor 60 faces the first internal space S1, it is possible to hold down the excessive rise in temperature of the pressure sensor 60. Therefore, it is possible to reduce the temperature drift of the detection signal from the pressure sensor 60, and thus, it is possible to more accurately detect the change in pressure in the second internal space S2.

It should be noted that the pressure sensor 60 is not particularly limited providing the pressure in the second internal space S2 can be detected, and a known sensor can be applied as the pressure sensor 60. For example, the pressure sensor 60 can be provided with a configuration having a diaphragm which is flexurally deformed by the pressure received, and a detection element (e.g., a piezoresistive element disposed on the diaphragm) for detecting the deflection of the diaphragm.

The force detection section 6 is hereinabove described. It should be noted that although in the present embodiment, the pressure sensor 60 is disposed so as to face the first internal space S1, the disposition of the pressure sensor 60 is not particularly limited providing the pressure in the second internal space S2 can be detected. For example, the pressure sensor 60 can also be provided to the flexible part 31.

Further, as shown in FIG. 2, the robot 1 is provided with a temperature detection section 7 disposed in the first internal space S1. Thus, it is possible to more accurately detect the temperature in the first internal space S1. Further, for example, it is possible to determine whether or not it is necessary to cool the first internal space S1 (i.e., to supply the fluid Q to the first internal space S1) based on the detection result of the temperature detection section 7, and thus, it is possible to properly cool the first internal space S1. Therefore, it is possible to more accurately keep the inside of the first internal space S1 at an appropriate temperature. Further, for example, it is also possible to correct (perform the temperature correction on) the detection result of the pressure sensor 60 based on the detection result of the temperature detection section 7. Therefore, it is possible to more accurately detect the pressure in the second internal space S2.

It should be noted that the configuration of the temperature detection section 7 is not particularly limited providing the temperature in the first internal space S1 can be detected, and it is possible to use, for example, a thermistor or a thermocouple as the temperature detection section 7.

Further, as shown in FIG. 2, the fluid supply section 5 is provided with the first flow channel 51 for supplying (guiding) the fluid Q from the fluid supply source 4 to the first internal space S1, a second flow channel 52 for supplying (guiding) the fluid Q from the fluid supply source 4 to the second internal space S2, and an opening/closing section 53 capable of adjusting the opening/closing degree of each of the first flow channel 51 and the second flow channel 52. More specifically, the fluid supply section 5 has a flow channel 54 (a pipe) having an end (an upstream end) connected to the fluid supply source 4, a valve 531 as the opening/closing section 53 connected to the other end (a downstream end) of the flow channel 54, the first flow channel 51 (a pipe) connected to the valve 531 in one end (an upstream end) and connected to the first internal space S1 in the other end (a downstream end), and the second flow channel 52 (a pipe) connected to the valve 531 in one end (an upstream end) and connected to the second internal space S2 through the housing 234 in the other end (a downstream end).

Therefore, for example, by opening (clearing off) the first flow channel 51 and closing (blocking) the second flow channel 52 using the valve 531, it is possible to realize a first state in which the fluid Q is supplied to the first internal space S1. Thus, it is possible to cool the first internal space S1 with the fluid Q. Therefore, it is possible to prevent excessive rise in the internal temperature of the robot 1 (to keep the temperature in the first internal space S1 at an appropriate temperature), and thus, it is possible to prevent a failure, deterioration and a variation of the drive characteristics, and so on of the robot 1. Therefore, by closing (blocking) the first flow channel 51 and opening (clearing off) the second flow channel 52 using the valve 531, it is possible to realize a second state in which the fluid Q is supplied to the second internal space S2. Thus, it is possible to provide the second internal space S2 with the positive pressure. According to such a fluid supply section 5, since the supply destination of the fluid Q can be selected only by driving the valve 531, the configuration of the fluid supply section 5 becomes simpler. It should be noted that the switching between the first state and the second state by the valve 531 can be performed so as to set each of the first flow channel 51 and the second flow channel 52 between the complete open state and the complete closed state, or in the state in which the first flow channel 51 and the second flow channel 52 are opened, it is also possible that the amount of the fluid Q to be supplied to the first internal space S1 and the second internal spate S2 can be adjusted in a step manner or in a stepless manner. In other words, it can be said that the opening/closing degree of the valve 531 can be adjusted including the configuration of switching between the complete open state and the complete closed state.

It should be noted that it is also possible for the fluid supply section 5 by the valve 531 to realize, for example, a third state in which the fluid Q is supplied to neither the first internal space S1 nor the second internal space S2 by closing (blocking) both of the first flow channel 51 and the second flow channel 52, or a fourth state in which the fluid Q is supplied to both of the first internal space S1 and the second internal space S2 by opening (clearing off) both of the first flow channel 51 and the second flow channel 52, besides the first and second states described above. Further, the valve 531 is not particularly limited providing the function described above can be achieved, and for example, an electromagnetic valve (a solenoid valve) can be used as the valve 531. Further, the valve 531 can also be provided with a configuration in which the valve opening can be adjusted in a multistep manner or in a stepless manner.

As shown in FIG. 2, the fluid supply source 4 as a supply source of the fluid Q is disposed inside the first internal space S1 together with the fluid supply section 5. Thus, the piping layout of the fluid supply section 5 (the first flow channel 51 and the second flow channel 52) becomes simpler. Further, since the first flow channel 51, the second flow channel 52, and the flow channel 54 can be shortened, it is possible to reduce the loss to efficiently supply the fluid Q to the first internal space S1 and the second internal space S2. Further, since the fluid supply section 5 is not exposed outside the robot 1 (the arm 234), for example, it is possible to prevent the first flow channel 51 and the second flow channel 52 from hindering the operation of the robot 1. It should be noted that the arrangement of the fluid supply source 4 is not particularly limited, but the fluid supply source 4 may be disposed outside the robot 1 (the arm 234) separately from the robot 1.

Further, as shown in FIG. 4, the fluid supply source 4 has a pump 40 having a piezoelectric element 43 as a drive source. Thus, the fluid supply source 4 small in size and light in weight is obtained, and it is possible to achieve reduction in size and weight of the robot 1.

Specifically, as shown in FIG. 4, the pump 40 is a diaphragm pump, and is provided with a base substrate 41, a diaphragm substrate 42 bonded to the base substrate 41 and provided with a diaphragm 421 which can be flexurally deformed, and a piezoelectric element 43 provided to the diaphragm 421 and deforming the diaphragm 421. It should be noted that as shown in FIG. 4, the pump 40 is supported by the support part 49. Further, although not shown in the drawings, the pump 40 is fixed to the housing 234a via the support part 49.

The base substrate 41 is provided with a through hole 411 functioning as a suction hole, and a through hole 412 functioning as a discharge hole. Further, the through hole 412 is connected to the flow channel 54, and the through hole 411 opens to the first internal space S1. It should be noted that it is also possible for the through hole 411 to be extracted outside the robot 1 via, for example, a pipe not shown, and then opens to the outside of the robot 1. Further, in the case of using a gas other than the air as the fluid Q, the through hole 411 is connected to a cylinder filled with the fluid Q via, for example, a pipe not shown.

The diaphragm 421 is disposed so as to be opposed to the base substrate 41, and between the diaphragm 421 and the base substrate 41, there is formed a pump chamber P. Further, the diaphragm 421 has a pump-part diaphragm 422, and two valve-part diaphragms 423, 424 disposed across the pump-part diaphragm 422. The valve-part diaphragms 423, 424 are disposed so as to be opposed to the through holes 411 422, and pedestals 425, 426 projecting toward the through holes 411, 412 are provided to the parts overlapping the through holes 411, 412, respectively. Further, gaskets 441, 442 are disposed on the lower surfaces of the pedestals 425, 426, and the through holes 411, 412 are kept in the closed state in the normal state due to the gaskets 441, 442.

Further, the piezoelectric element 43 has a first piezoelectric element 431 provided to the pump-part diaphragm 422 and flexurally deforming the pump-part diaphragm 422, a second piezoelectric element 432 provided to the valve-part diaphragm 423 and flexurally deforming the valve-part diaphragm 423, and a third piezoelectric element 433 provided to the valve-part diaphragm 424 and flexurally deforming the valve-part diaphragm 424, and the three piezoelectric elements 431, 432, and 433 are driven independently of each other by the control of a circuit element 8 described later. As described above, by disposing the piezoelectric elements 43 on the diaphragms 421, it is possible to efficiently transfer the driving force of the piezoelectric elements 43 to the diaphragms 421. Further, by adopting the piezoelectric elements 43 as the drive source, it is possible to achieve the reduction in size and weight of the pump 40.

Then, by moving the valve-part diaphragms 423, 424 upward due to the drive of the second and third piezoelectric elements 432, 433, it is possible to open the through holes 411, 412. Further, it is possible to realize suction of the gas by moving the pump-part diaphragm 422 upward due to the drive of the first piezoelectric element 431, and realize discharge of the gas by moving the pump-part diaphragm 422 downward. Further, by controlling the drive timings of the pump-part diaphragm 422 and the valve-part diaphragms 423, 424, it becomes possible to feed the gas in an arbitrary direction.

Since the pump 40 described above uses the piezoelectric elements 43 as the drive source, the vibration is small compared to the case in which, for example, the drive source is an electric motor. Therefore, it is possible to reduce the vibration of the robot 1 due to the operation of the fluid supply source 4, and it is possible to reduce the deterioration of the operation accuracy of the robot 1. It should be noted that as shown in FIG. 4, in the present embodiment, there is adopted the configuration in which the through hole 412 opens to the first internal space S1, and the pump 40 suctions the air in the first internal space S1, but this is not a limitation. It is also possible to adopt a configuration in which, for example, a pipe not shown in the drawings is connected to the through hole 412, the through hole 412 opens to the outside of the housing 234 (the robot 1) via the pipe to suction the air located outside the robot 1. Thus, it is possible to use the air lower in temperature than the air located inside the first internal space S1, and the first internal space S1 can more efficiently be cooled.

It should be noted that the configuration of the fluid supply source 4 is not particularly limited providing the fluid Q can be supplied to the first internal space S1 and the second internal space S2. For example, as described above, in the case of using a noble gas as the fluid Q, it is possible to adopt a configuration having a cylinder filled with the noble gas with high pressure.

Further, the robot 1 is provided with the circuit element 8 disposed inside the first internal space S1. Thus, the circuit element 8 can be protected. The circuit element 8 is electrically connected to the pump 40, the pressure sensor 60, the valve 531 and the temperature detection section 7. Further, the circuit element 8 functions as a control section, and controls drive of the pump 40 and the valve 531 based on the detection result of, for example, the pressure sensor 60 and the temperature detection section 7.

Such a circuit element 8 (the control section) controls the drive of the pump 40 and the valve 531 so that the temperature in the first internal space S1 is kept in a predetermined range (e.g., not lower than 50° C. and not higher than 80° C.). The temperature in the first internal space S1 varies by the environmental temperature, the drive condition and the continuous drive duration of the robot 1 and so on. Therefore, by keeping the temperature in the first internal space S1 in the predetermined range due to the control by such a circuit element 8, it is possible to drive the robot 1 under more optimum temperature, and it is possible to more accurately drive the robot 1, and at the same time, it is possible to more efficiently prevent the failure or the like of the robot 1.

Further, the circuit element 8 (the control section) controls the drive of the pump 40 and the valve 531 so that the pressure in the second internal space S2 is kept at a predetermined value (e.g., the positive pressure of about +5 kPa of the atmospheric pressure as described above) in the natural state. The pressure in the second internal space S2 varies by the temperature variation, gas leakage with time, and so on. Therefore, it is possible to keep the pressure in the second internal space S2 in the natural state at the predetermined value due to the control by such a circuit element 8. Thus, it is possible to hold down the deterioration with time of the shock absorption of the shock-absorbing section 3 and the deterioration with time of the contact detection characteristic with the contacted object X.

As described hereinabove, the circuit element 8 (the control section) realizes the first state in which the fluid Q is supplied to the first internal space S1 or realizes the second state in which the fluid Q is supplied to the second internal space S2 based on the detection result (the temperature in the first internal space S1 and the pressure in the second internal space S2) of the temperature detection section 7 and the pressure sensor 60. Here, it is conceivable that both of the temperature in the first internal space S1 and the pressure in the second internal space S2 are respectively shifted from the predetermined values at the same time. In such a case, as described above, if it is possible to open both of the first flow channel 51 and the second flow channel 52 to realize the fourth state in which the fluid Q is supplied to the first internal space S1 and the second internal space S2, it is sufficient to realize the fourth state. However, if it is not possible to realize the fourth state, it is necessary to give priority to either one of the first state and the second state. In other words, it is necessary to select either one of a process of firstly realizing the first state to set the temperature in the first internal space S1 to the predetermined value, and then realizing the second state, and a process of firstly realizing the second state to set the pressure in the second internal space S2 to the predetermined value, and then realizing the first state, on the contrary. For example, if it is attempted to accurately drive the robot 1 rather than detecting the contact with the contacted object X, it is sufficient to select the former process, or if it is attempted to accurately detect the contact with the contacted object X rather than accurately driving the robot 1, on the contrary, it is sufficient to select the latter process.

It should be noted that although in the present embodiment, the circuit element 8 is disposed inside the first internal space S1, the arrangement of the circuit element 8 is not particularly limited. Further, it is also possible for the circuit element 8 to be included in the robot control section 25.

FIG. 5 shows an example of the change (i.e., the detection signal of the pressure sensor 60) in the pressure in the second internal space S2 when the contact with the contacted object X occurs. This graph shows the change in pressure in the case in which the contacted object X has contact with the shock-absorbing section 3 at the time T1, and then the contacted object X is separated from the shock-absorbing section 3 at the time T2. As shown in the drawing, when the contacted object X has contact with the shock-absorbing section 3 at the time T1, the pressure in the second internal space S2 rapidly increases, and then, when the contact with the contacted object X is released at the time T2, the pressure promptly returns to the pressure in the natural state.

As shown in FIG. 5, the circuit element 8 (control section) determines that the contact with the contacted object X has occurred in the case in which the pressure in the second internal space S2 has dramatically increased, and determines that the contact with the contacted object X has been released if the pressure in the second internal space S2 has returned to the natural state. Then, in the case in which the circuit element 8 has determined that the contact with the contacted object X has occurred, the circuit element 8 transmits the information to the robot control section 25 of the robot main body 2. In the case in which the robot control section 25 has received the information that the contact with the contacted object X has occurred from the circuit element 8, the robot control section 25 promptly stops the robot main body 2, for example. Thus, it is possible to prevent the breakage of the robot 1 or the contacted object X, and in particular, the safety of the operator as the contacted object X can be ensured. In contrast, in the case in which the circuit element 8 has determined that the contact with the contacted object X has been released, the circuit element 8 transmits the information to the robot control section 25. In the case in which the robot control section 25 has received the information that the contact with the contacted object X has been released from the circuit element 8, the robot control section 25 promptly resumes the drive of the robot main body 2, for example. Thus, it is possible to shorten the time loss due to the contact with the contacted object X.

The robot 1 is hereinabove described in detail. According to the robot 1, as described above, it is possible to accurately detect the presence or absence of the contact with the contacted object X, and it becomes possible to safely drive the robot 1.

Second Embodiment

Then, a robot according to a second embodiment of the invention will be described.

Figure 6:
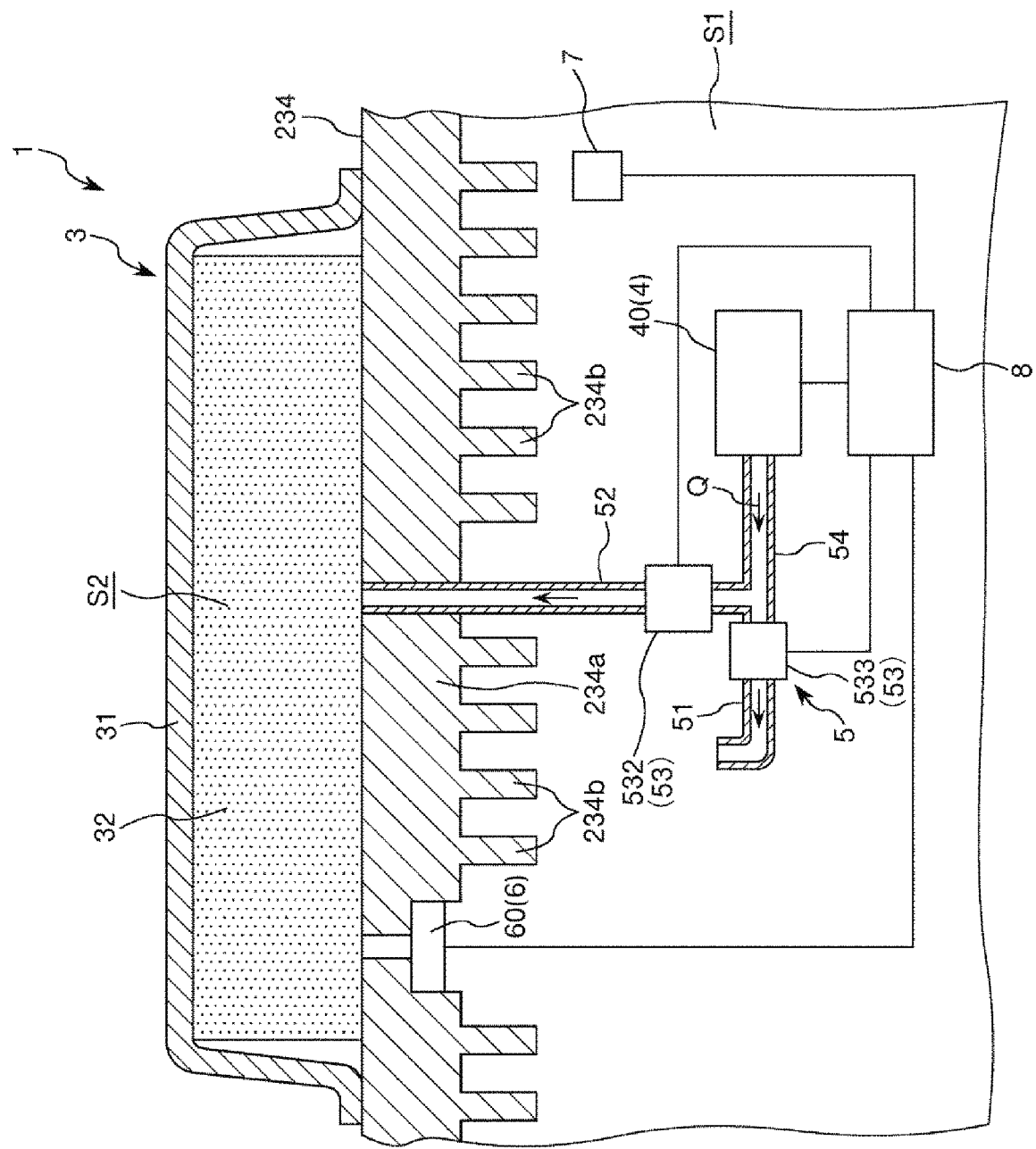
FIG. 6 is a partial enlarged cross-sectional view showing a robot according to a second embodiment of the invention.

FIG. 6 is a partial enlarged cross-sectional view showing the robot according to the second embodiment of the invention.

The robot 1 according to the present embodiment is substantially the same as the robot 1 according to the first embodiment described above except mainly the point that the configuration of the fluid supply section 5 is different.

It should be noted that in the following description, the robot 1 according to the second embodiment will be described with a focus on the difference from the first embodiment described above, and the description of substantially the same issues will be omitted. Further, in FIG. 6, the constituents substantially identical to those of the embodiments described above are denoted by the same reference symbols.

As shown in FIG. 6, in the robot 1 according to the present embodiment, the opening/closing section 53 has a first valve 532 disposed in the middle of the first flow channel 51 and capable of opening/closing the first flow channel 51, and a second valve 533 disposed in the middle of the second flow channel 52 and capable of opening/closing the second flow channel 52. Further, the drive (drive of opening/closing) of the first valve 532 and the drive (drive of opening/closing) of the second valve 533 are controlled by the circuit element 8 independently of each other. According also to such a configuration, it is possible to easily and surely realize the first state in which the fluid Q is supplied to the first internal space S1, and the second state in which the fluid Q is supplied to the second internal space S2. Further, in particular, by adopting such a configuration, it becomes easy to realize the third state in which the fluid Q is supplied to neither the first internal space S1 nor the second internal space S2 by closing both of the first flow channel 51 and the second flow channel 52, or a fourth state in which the fluid Q is supplied to both of the first internal space S1 and the second internal space S2 by opening both of the first flow channel 51 and the second flow channel 52 compared to the first embodiment described above.

According also to such a second embodiment as described above, substantially the same advantages as in the first embodiment described above can be obtained.

Third Embodiment

Then, a robot according to a third embodiment of the invention will be described.

Figure 7:
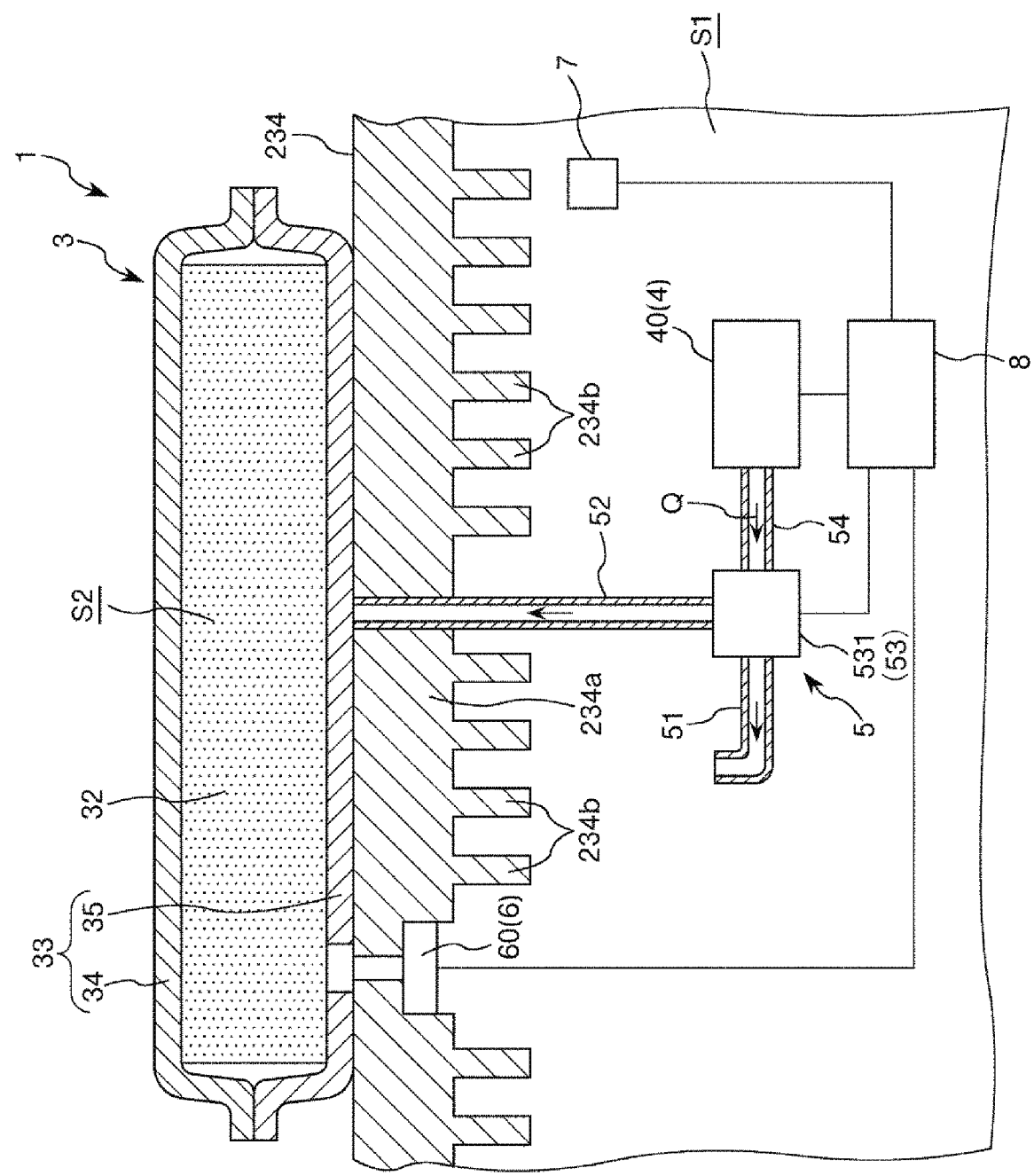
FIG. 7 is a partial enlarged cross-sectional view showing a robot according to a third embodiment of the invention.

FIG. 7 is a partial enlarged cross-sectional view showing the robot according to the third embodiment of the invention.

The robot 1 according to the present embodiment is substantially the same as the robot 1 according to the first embodiment described above except mainly the point that the configuration of the shock-absorbing section 3 is different.

It should be noted that in the following description, the robot 1 according to the third embodiment will be described with a focus on the difference from the first embodiment described above, and the description of substantially the same issues will be omitted. Further, in FIG. 7, the constituents substantially identical to those of the embodiments described above are denoted by the same reference symbols.

As shown in FIG. 7, in the robot 1 according to the present embodiment, the shock-absorbing section 3 has a bag part 33 having the second internal space S2 inside, and the regulating part 32 disposed inside the bag part 33. Further, the bag part 33 has a first flexible part 34 and a second flexible part 35 each having a sheet-like shape, and has a configuration in which the outer peripheral edges of the respective flexible parts are bonded to each other. It should be noted that it is also possible for the first flexible part 34 and the second flexible part 35 to be integrated with each other. Specifically, it is also possible to form the bag part 33 by, for example, doubling up a single sheet, and then bonding the outer circumferential edges of the two folded pieces to each other.

According to such a configuration, since the second internal space S2 has already been formed in the bag part 33, the robot 1 having the shock-absorbing section 3 can easily be obtained only by attaching the bag part 33 to the housing 234a of the arm 234.

According also to such a third embodiment as described above, substantially the same advantages as in the first embodiment described above can be exerted.

Fourth Embodiment

Then, a robot according to a fourth embodiment of the invention will be described.

Figure 8:
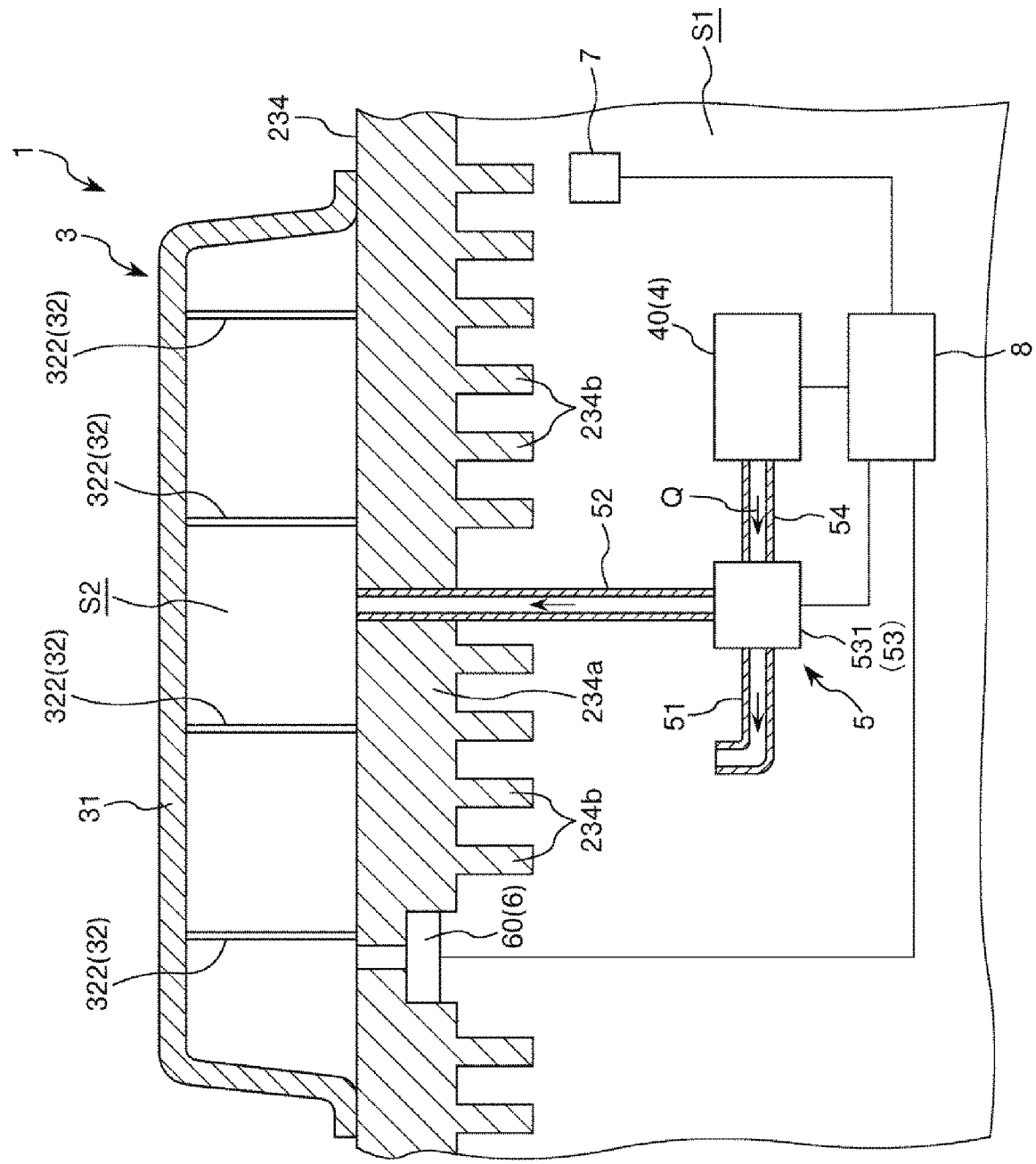
FIG. 8 is a partial enlarged cross-sectional view showing a robot according to a fourth embodiment of the invention.

FIG. 8 is a partial enlarged cross-sectional view showing the robot according to the fourth embodiment of the invention.

The robot 1 according to the present embodiment is substantially the same as the robot 1 according to the first embodiment described above except mainly the point that the configuration of the shock-absorbing section 3 is different.

It should be noted that in the following description, the robot 1 according to the fourth embodiment will be described with a focus on the difference from the first embodiment described above, and the description of substantially the same issues will be omitted. Further, in FIG. 8, the constituents substantially identical to those of the first embodiment described above are denoted by the same reference symbols.

As shown in FIG. 8, in the robot 1 according to the present embodiment, the regulating part 32 is formed of a plurality of soft linear objects 322. Further, one end part of each of the linear objects 322 is fixed to the flexible part 31, and the other end part thereof is fixed to the housing 234a. Further, by fully stretching these linear objects 322, the displacement of the flexible part 31 toward the direction of getting away from the arm 234 is regulated.

According also to such a fourth embodiment as described above, substantially the same advantages as in the first embodiment described above can be exerted.

Although the robot according to the invention is hereinabove described based on the embodiments shown in the accompanying drawings, the invention is not limited to these embodiments, but the configuration of each of the components can be replaced with any configuration having an identical function. Further, it is also possible to add any other constituents to the invention. Further, it is also possible to arbitrarily combine any of the embodiments.

Further, although in the embodiments described above, there is used the six-axis articulated robot having the six rotary axes as the robot, the robot is not limited to this example, but can also be, for example, a dual-arm robot having a body and two articulated arms, or can also be a scalar robot (a horizontal articulated robot).

The entire disclosure of Japanese Patent Application No. 2016-230931, filed Nov. 29, 2016 is expressly incorporated by reference herein.

What is claimed is:

1. A robot comprising:
    an arm having a first internal space;
    a shock absorber disposed on a surface of the arm, and having a second internal space;
    a fluid supply; and a state switching section configured to switch between a first state of supplying a fluid from the fluid supply to the first internal space and a second state of supplying the fluid from the fluid supply to the second internal space, wherein the state switching section includes:
   a first flow channel adapted to supply the fluid from the fluid supply to the first internal space;
   a second flow channel adapted to supply the fluid from the fluid supply to the second internal space; and
   a valve capable of adjusting opening/closing degrees of each of the first flow channel and the second flow channel.

2. The robot according to claim 1, wherein the second internal space is sealed, and is provided with positive pressure in a natural state.

3. The robot according to claim 2, further comprising: a force detector adapted to detect force applied to the shock absorber.

4. The robot according to claim 3, wherein the force detector is provided with a pressure sensor adapted to detect pressure in the second internal space.

5. The robot according to claim 3, wherein the force detector is disposed on the arm.

6. The robot according to claim 1, wherein the shock absorber includes:
   a flexible housing disposed outside the arm, and forming the second internal space between the flexible housing and the arm; and
   a regulator disposed between the arm and the flexible housing, and adapted to regulate a displacement of the flexible housing in a direction away from the arm.

7. The robot according to claim 1, wherein the fluid supply is disposed in the first internal space.

8. The robot according to claim 7, wherein the fluid supply has a pump using a piezoelectric element as a drive source.

9. The robot according to claim 1, further comprising: a temperature detector disposed inside the first internal space.

10. The robot according to claim 1, further comprising: a circuit element disposed inside the first internal space.

11. The robot according to claim 1, wherein a wall forming the first internal space has a projection on a surface facing the first internal space.

* * * * *